(12) United States Patent
Trim et al.

(10) Patent No.: US 11,321,084 B1
(45) Date of Patent: May 3, 2022

(54) APPLICATION FUNCTION CONSOLIDATION RECOMMENDATION

(71) Applicant: International Business Machines Corporation, Armonk, NY (US)

(72) Inventors: Craig M. Trim, Ventura, CA (US); James E. Bostick, Cedar Park, TX (US); John M. Ganci, Jr., Raleigh, NC (US); Martin G. Keen, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 11 days.

(21) Appl. No.: 17/140,300

(22) Filed: Jan. 4, 2021

(51) Int. Cl.
*G06F 8/71* (2018.01)
*G06N 7/00* (2006.01)

(52) U.S. Cl.
CPC ............... *G06F 8/71* (2013.01); *G06N 7/005* (2013.01)

(58) Field of Classification Search
USPC ......................................................... 717/121
See application file for complete search history.

(56) References Cited

U.S. PATENT DOCUMENTS

| | | | |
|---|---|---|---|
| 6,362,838 B1 | 3/2002 | Szlam et al. | |
| 7,542,980 B2 | 6/2009 | Tsyganskiy et al. | |
| 7,574,694 B2 | 8/2009 | Mangan et al. | |
| 8,370,354 B2 | 2/2013 | Bostick et al. | |
| 8,843,909 B2 | 9/2014 | Tondreau, Jr. et al. | |
| 9,411,864 B2 | 8/2016 | Glider et al. | |
| 9,542,232 B2 | 1/2017 | Beaty et al. | |
| 9,740,459 B2 | 8/2017 | Bohm et al. | |
| 9,864,616 B2 | 1/2018 | Srinivasan et al. | |
| 10,001,985 B2 | 6/2018 | Lategan | |
| 2013/0086038 A1* | 4/2013 | Perry | G06F 16/217 707/715 |
| 2014/0309914 A1* | 10/2014 | Scofield | G08G 1/0104 701/119 |
| 2020/0175010 A1 | 6/2020 | Vaghani et al. | |

\* cited by examiner

*Primary Examiner* — John Q Chavis
(74) *Attorney, Agent, or Firm* — Garg Law Firm, PLLC; Rakesh Garg; Michael O'Keefe

(57) ABSTRACT

By analyzing execution of a set of transactions by an application, a set of actual code execution paths of the application are determined. From the set of actual code execution paths, a set of predicted execution paths of the application are predicted using an execution prediction model. The set of predicted execution paths includes the set of actual code execution paths. By determining that paths in the set of predicted execution paths have above a threshold similarity to each other, a cluster of predicted execution paths is identified. The cluster of predicted execution paths is recommended, using a recommendation model, for implementation as a single execution path in a revised version of the application.

20 Claims, 8 Drawing Sheets

APPLICATION FUNCTION CONSOLIDATION RECOMMENDATION

BACKGROUND

The present invention relates generally to a method, system, and computer program product for software application analysis. More particularly, the present invention relates to a method, system, and computer program product for application function consolidation recommendation.

Many software applications used to process transactions today were initially implemented years or decades ago, using the programming and scripting languages (e.g. Cobol, PL/1, or Rexx scripts), and platforms common when an application was initially designed. These applications have typically been added to and updated over time without much analysis of the overall application's architecture. Instead, as application developers come and go they often find it easier to add functionality by copying existing functionality and implementing minor modifications, rather than rewriting existing code.

Application modernization is the process of modernizing an existing software application's platform infrastructure, internal architecture, or features.

SUMMARY

The illustrative embodiments provide a method, system, and computer program product. An embodiment includes a method that determines, by analyzing execution of a set of transactions by an application, a set of actual code execution paths of the application. An embodiment predicts, from the set of actual code execution paths using an execution prediction model, a set of predicted execution paths of the application, the set of predicted execution paths including the set of actual code execution paths. An embodiment identifies, by determining that paths in the set of predicted execution paths have above a threshold similarity to each other, a cluster of predicted execution paths. An embodiment recommends, for implementation as a single execution path in a revised version of the application using a recommendation model, the cluster of predicted execution paths An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
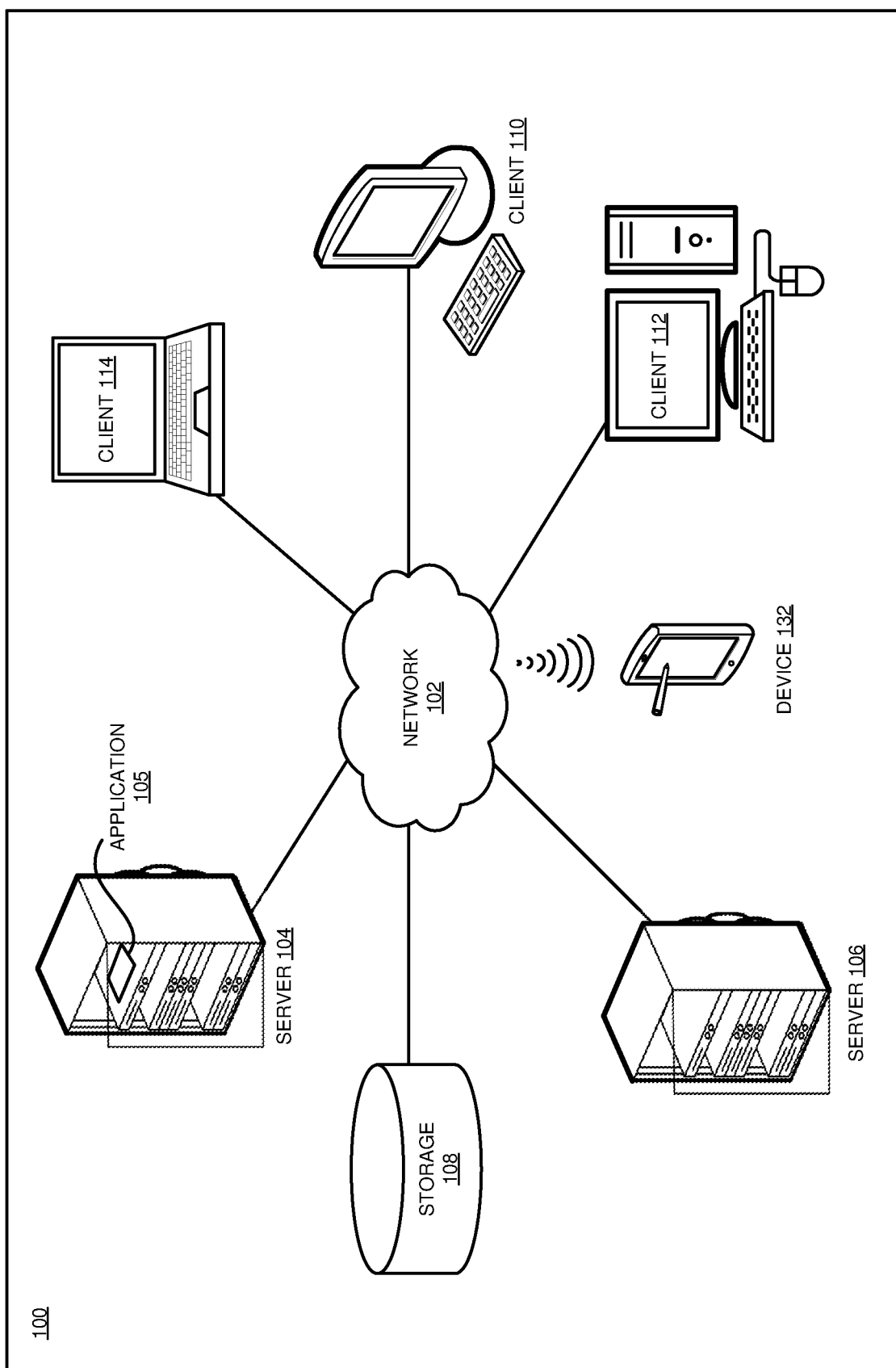
FIG. 1 depicts a block diagram of a network of data processing systems in which illustrative embodiments may be implemented.

The illustrative embodiments recognize that as a software application is updated over time, the application often includes inefficiencies. Because application developers often add functionality by copying existing functionality and implementing minor modifications, there may be several portions of code performing very similar functions that could be consolidated together, making the overall application smaller and hence more efficient. There may be portions of code that are no longer executed at all, but a developer either did not notice or was afraid to remove the code for fear of introducing an error. These unused portions of code still consume memory and storage space. Additional efficiencies might also be realized if some portions of, or an entire application, were rewritten in a more modern computer language (e.g. Java) or implemented using more flexibly configurable interfaces between components, such as web services or microservices. (Java is a registered trademark of Oracle Corporation in the United States and other countries.)

The illustrative embodiments also recognize that application modernization is difficult without a thorough analysis of an existing application to be modernized. However, because applications have been modified over many years, with a view towards solving an immediate problem rather than preserving an efficient architecture, identifying portions of code to be modernized is difficult for human developers. Because application developers often add functionality by copying existing functionality and implementing minor modifications, many functions look similar but perform slightly differently. Code might have been updated without updating documentation of that code, or there might be no documentation at all. Application code might be specific to a particular platform, architecture, or obsolete hardware without this specificity being obvious to a developer. In addition, the greatest efficiency improvements are obtained when software code that is used most frequently is modernized, and when as many functions as possible are consolidated together. Although tools are presently available to determine which portions of an application are used most frequently, such tools are not well integrated with the additional needed functionality. As well, human developers find it difficult to determine which functions are similar to which other functions, and measure similarity accurately. Consequently, the illustrative embodiments recognize that there is an unmet need for an automated system that analyzes both source code and performance of an existing application to be modernized, while the application is executing, and identifies and recommends specific application functions for consolidation.

The illustrative embodiments recognize that the presently available tools or solutions do not address these needs or provide adequate solutions for these needs. The illustrative embodiments used to describe the invention generally address and solve the above-described problems and other problems related to application function consolidation recommendation.

An embodiment can be implemented as a software application. The application implementing an embodiment can be configured as a modification of an existing application development system, as a separate application that operates in conjunction with an existing application development system, a standalone application, or some combination thereof.

Particularly, some illustrative embodiments provide a method that determines, by analyzing execution of a set of transactions by an application, a set of actual code execution paths of the application, uses an execution prediction model to predict a set of predicted execution paths of the application, identifies one or more clusters of similar predicted execution paths, and recommends a cluster of predicted execution paths for implementation as a single execution path in a revised version of the application.

An embodiment analyzes changes in application code over time. Developers typically modify some portions of an application's source code more frequently than other portions. Because rarely-modified application portions have had less developer attention than frequently-modified portions, the rarely-modified portions are less likely to already be up to date and should benefit most from an application modernization process. Thus, an embodiment uses presently available techniques to analyze a repository of application source code to determine which portions of source code are checked into the repository and how often check-ins occur. An embodiment also uses presently available techniques to analyze deployments of portions of, or an entire application, a platform or other infrastructure on which a deployment executes, and how often deployments occur. An embodiment uses code repository and deployment data to determine an application's initial deployment, frequency of source code updates and deployments, which portions are updated and deployed most and least frequently, and an application's source code and executable code at a particular time.

An embodiment analyzes an application's execution of a set of transactions to determine a set of actual code execution paths of the application. Applications process transactions. For example, in an application that processes credit card payments, the set of transactions might include operations to validate each of a credit card number, expiration date, and security code, an operation to determine that a particular purchase amount does not exceed the cardholder's credit limit, and operations to debit the cardholder's account and credit the payee's account appropriately. In one embodiment, the set of transactions is the normal operation of the application being analyzed, either continuously or for a predetermined period of time. In another embodiment, the set of transactions includes transactions intended to exercise particular execution paths of an application that might not be executed or might rarely be executed in the application's everyday operations. For example, a credit card processing application might include a set of reconciliation functions that are normally executed at month-end or year-end, outside the period during which the application is being analyzed, and thus an additional set of transactions using the reconciliation functions might be generated for execution analysis. As another example, the set of transactions might include a set of test transactions, such as a test suite intended to validate correct implementation of a new application deployment. Presently available techniques for application analysis include real-time application execution monitoring and code parsing monitoring, transaction log file analysis, and historical usage documentation analysis. Other application execution analysis techniques are also available and contemplated within the scope of the illustrative embodiments.

One embodiment formats application execution analysis results into a computation graph. A computation graph (also called a computational graph) is a directed graph in which nodes of the graph represent operations on data and edges of the graph represent inputs (i.e. function parameters) to nodes. Thus, the embodiment produces a computation graph representing actual code execution paths of the application being analyzed. In the computation graph, a projection is an execution path of the application. Some nodes join multiple projections as a union (a set containing all the elements of all input sets) and some nodes join multiple projections as an intersection (a set containing elements common to all input sets).

An embodiment uses a set of actual code execution paths of an application being analyzed to predict a set of possible code execution paths of the application. When application execution is being monitored, the transactions the application processes might not execute all of the application's execution paths. Thus, an embodiment supplements the set of actual code execution paths with a set of possible code execution paths.

One embodiment uses an execution prediction model implemented as a neural network model to predict a set of possible code execution paths. In particular, the embodiment computes a permutation of an actual code execution path and uses the neural network model to predict a probability that the application will execute the permutation in response to a transaction that was not received during execution monitoring. One embodiment also predicts a confidence level in the predicted probability. One embodiment uses, as the predicted probability, a weighted sum of probabilities of previous permutations, where each weight represents a confidence level of a corresponding probability. If each probability is a range between −1.0 (representing zero percent probability) and +1.0 (representing one hundred percent probability), and ff the weighted sum is negative, this indicates that the permutation cannot happen, and the permutation's probability is set to zero. If each probability is a range between zero (representing zero percent probability) and one (representing one hundred percent probability), and if the weighted sum is zero, this indicates that the permutation cannot happen, and the permutation's probability is set to zero. An embodiment incorporates the set of possible execution paths into a computation graph representing actual code execution paths of the application being analyzed. The resulting computation graph includes both actual and possible execution paths of the application.

An embodiment continues to monitor application execution, compares the application's actual execution paths with predicted execution paths, and uses the comparison results to train the neural network model. Training rewards predictions that actually occur and penalizes predictions that do not occur, thus refining the model over time.

An embodiment determines that a set of paths in the set of predicted and actual execution paths have above a threshold similarity to each other, and forms the set of paths into a cluster of predicted execution paths. One embodiment uses the computation graph to cluster paths using a variant of a presently available mean-shifting algorithm. The algorithm identifies paths in the predicted computation graph with high density using multiple mean-shifting steps to generate multiple local density maximums, thus finding multiple clusters.

An embodiment uses a recommendation model to recommend a cluster of predicted execution paths for implementation as a single execution path in a revised version of the application being analyzed. The recommendation model takes into account one or more recommendation factors. One recommendation factor is the impact consolidating a cluster would have on interactions between the functions being consolidated and other application functionality. Because incorrectly managing such interactions can lead to application bugs, a cluster with fewer interactions is preferred over a cluster with more interactions. Another recommendation factor is the number of functions that can be consolidated together or the size of the cluster. Consolidating a large number of functions or a large cluster together produces greater application efficiencies and space savings than consolidating fewer functions or a smaller cluster, at the cost of a similar amount of developer time; thus consolidating more functions or a larger cluster is preferred over consolidating fewer functions or a smaller cluster. Another recommendation factor is the maturity and expected future usage of the functionality or cluster to be consolidated, because if the code is still under active development or is not expected to be needed in the future there is little to be gained from a consolidation. Another recommendation factor is a cost savings resulting from a consolidation, including application maintenance costs (measured in developers' time) and the compute efficiency of the revised application. Other recommendation factors are also possible and contemplated within the scope of the illustrative embodiments.

Once a user accepts and implements a recommendation, an embodiment repeats the application analysis process to determine a set of actual execution paths of the revised application and compares the revised application's execution paths with those of the original application. The embodiment uses the comparison to adjust the recommendation model. For example, if a cluster of execution paths was consolidated but did not result in as great an efficiency improvement as projected, an embodiment reduces a projected efficiency improvement for a similar cluster.

The manner of application function consolidation recommendation described herein is unavailable in the presently available methods in the technological field of endeavor pertaining to software application development. A method of an embodiment described herein, when implemented to execute on a device or data processing system, comprises substantial advancement of the functionality of that device or data processing system in determining, by analyzing execution of a set of transactions by an application, a set of actual code execution paths of the application, using an execution prediction model to predict a set of predicted execution paths of the application, identifying one or more clusters of similar predicted execution paths, and recommending a cluster of predicted execution paths for implementation as a single execution path in a revised version of the application.

The illustrative embodiments are described with respect to certain types of application analyses, permutations, predictions, computation graphs, clusters, recommendation factors, thresholds, adjustments, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
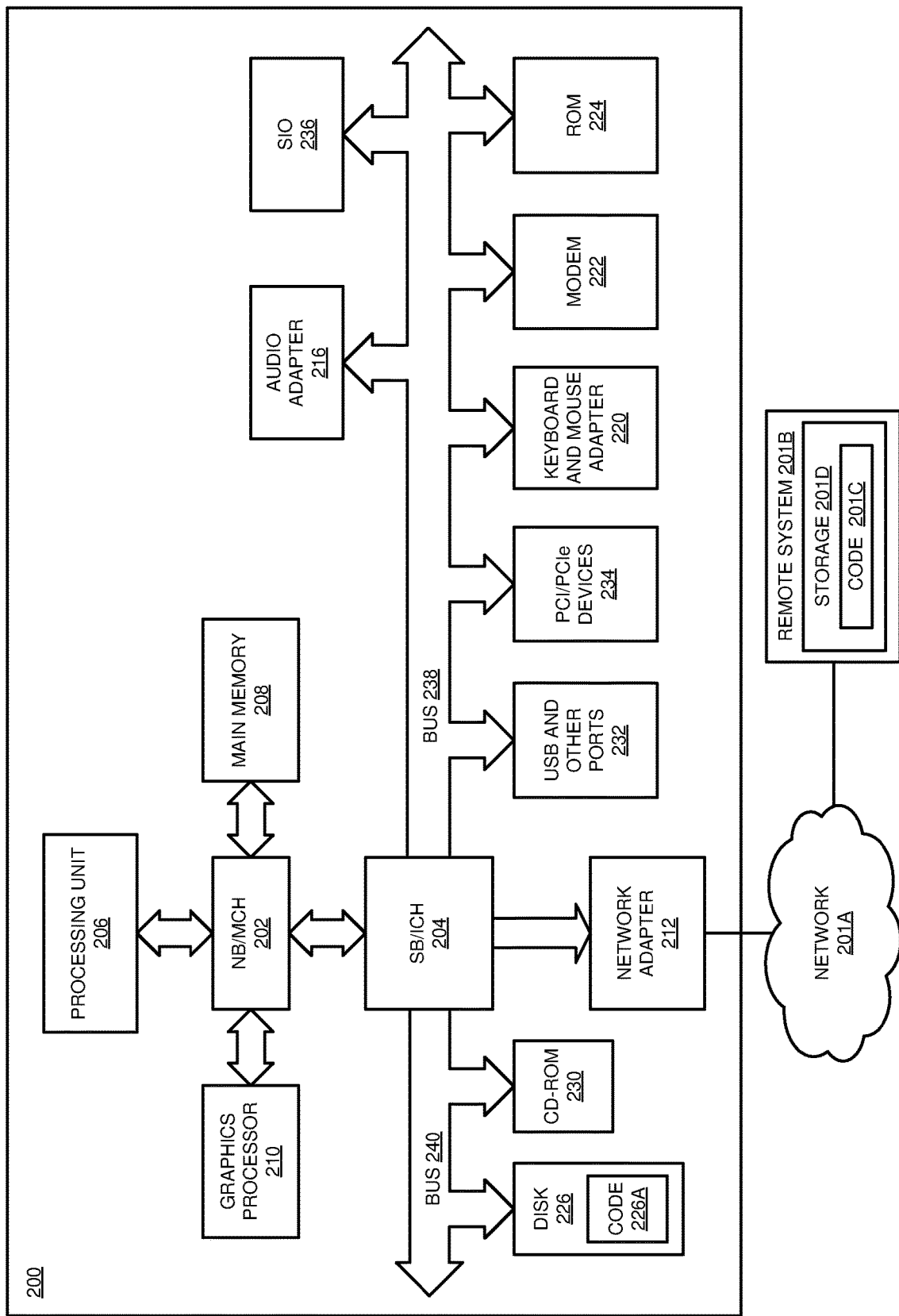
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
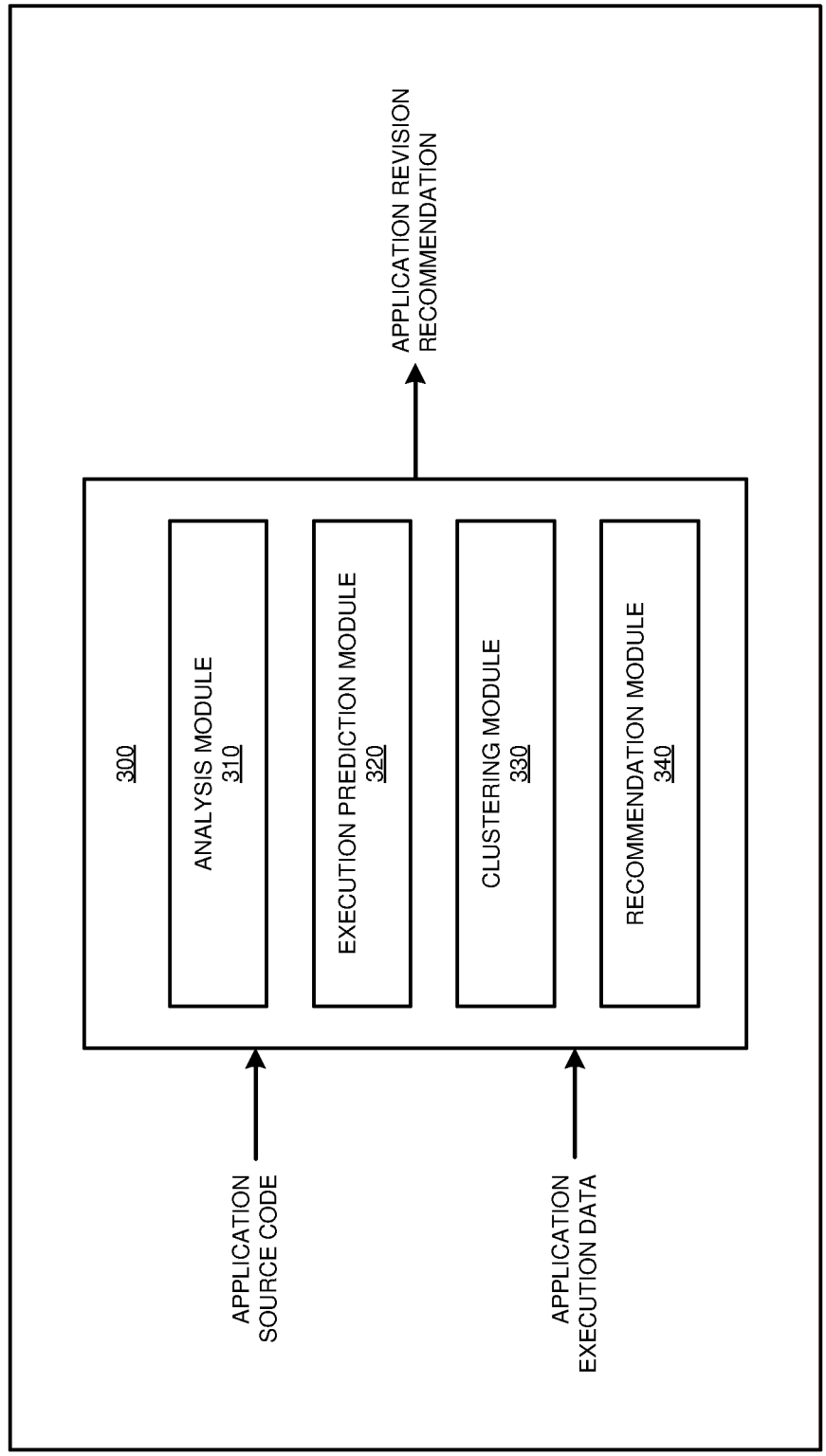
FIG. 3 depicts a block diagram of an example configuration for application function consolidation recommendation in accordance with an illustrative embodiment.

With reference to FIG. 3, this figure depicts a block diagram of an example configuration for application function consolidation recommendation in accordance with an illustrative embodiment. Application 300 is an example of application 105 in FIG. 1 and executes in any of servers 104 and 106, clients 110, 112, and 114, and device 132 in FIG. 1.

Analysis module 310 analyzes changes in application code over time. Using presently available techniques, module 310 analyzes a repository of application source code to determine which portions of source code are checked into the repository and how often check-ins occur. Module 310 also uses presently available techniques to analyze deployments of portions of, or an entire application, a platform or other infrastructure on which a deployment executes, and how often deployments occur. Module 310 uses code repository and deployment data to determine an application's initial deployment, frequency of source code updates and deployments, which portions are updated and deployed most and least frequently, and an application's source code and executable code at a particular time.

Analysis module 310 analyzes an application's execution of a set of transactions to determine a set of actual code execution paths of the application. In one implementation of module 310, the set of transactions is the normal operation of the application being analyzed, either continuously or for a predetermined period of time. In another implementation of module 310, the set of transactions includes transactions intended to exercise particular execution paths of an application that might not be executed or might rarely be executed in the application's everyday operations. Presently available techniques for application analysis include real-time application execution monitoring and code parsing monitoring, transaction log file analysis, and historical usage documentation analysis. Module 310 formats application execution analysis results into a computation graph.

Execution prediction module 320 uses an execution prediction model implemented as a neural network model to predict a set of possible code execution paths of the application from the set of actual code execution paths of the application. In particular, module 320 computes a permutation of an actual code execution path and uses the neural network model to predict a probability that the application will execute the permutation in response to a transaction that was not received during execution monitoring. One implementation of module 320 uses, as the predicted probability, a weighted sum of probabilities of previous permutations, where each weight represents a confidence level of a corresponding probability. Module 320 also predicts a confidence level in the predicted probability. Module 320 incorporates the set of possible execution paths into a computation graph already representing actual code execution paths of the application being analyzed. The resulting combined computation graph includes both actual and possible execution paths of the application.

Module 310 continues to monitor application execution. Module 320 compares the application's actual execution paths with predicted execution paths and uses the comparison results to train the neural network model. Training rewards predictions that actually occur and penalizes predictions that do not occur, thus refining the model over time.

Clustering module 330 determines that a set of paths in the set of predicted and actual execution paths have above a threshold similarity to each other, and forms the set of paths into a cluster of predicted execution paths. One implementation of module 330 uses the computation graph to cluster paths using a variant of a mean-shifting algorithm.

Recommendation module 340 uses a recommendation model to recommend a cluster of predicted execution paths for implementation as a single execution path in a revised version of the application being analyzed. The recommendation model takes into account one or more recommendation factors. One recommendation factor is the impact consolidating a cluster would have on interactions between the functions being consolidated and other application functionality. Because incorrectly managing such interactions can lead to application bugs, a cluster with fewer interactions is preferred over a cluster with more interactions. Another recommendation factor is the number of functions that can be consolidated together or the size of the cluster. Consolidating a large number of functions or a large cluster together produces greater application efficiencies and space savings than consolidating fewer functions or a smaller cluster, at the cost of a similar amount of developer time; thus consolidating more functions or a larger cluster is preferred over consolidating fewer functions or a smaller cluster. Another recommendation factor is the maturity and expected future usage of the functionality or cluster to be consolidated, because if the code is still under active development or is not expected to be needed in the future there is little to be gained from a consolidation. Another recommendation factor is a cost savings resulting from a consolidation, including application maintenance costs (measured in developers' time) and the compute efficiency of the revised application. Other recommendation factors are also possible.

Once a user accepts and implements a recommendation, module 310 repeats the application analysis process to determine a set of actual execution paths of the revised application and compares the revised application's execution paths with those of the original application. Module 340 uses the comparison to adjust the recommendation model. For example, if a cluster of execution paths was consolidated but did not result in as great an efficiency improvement as projected, an embodiment reduces a projected efficiency improvement for a similar cluster.

Figure 4:
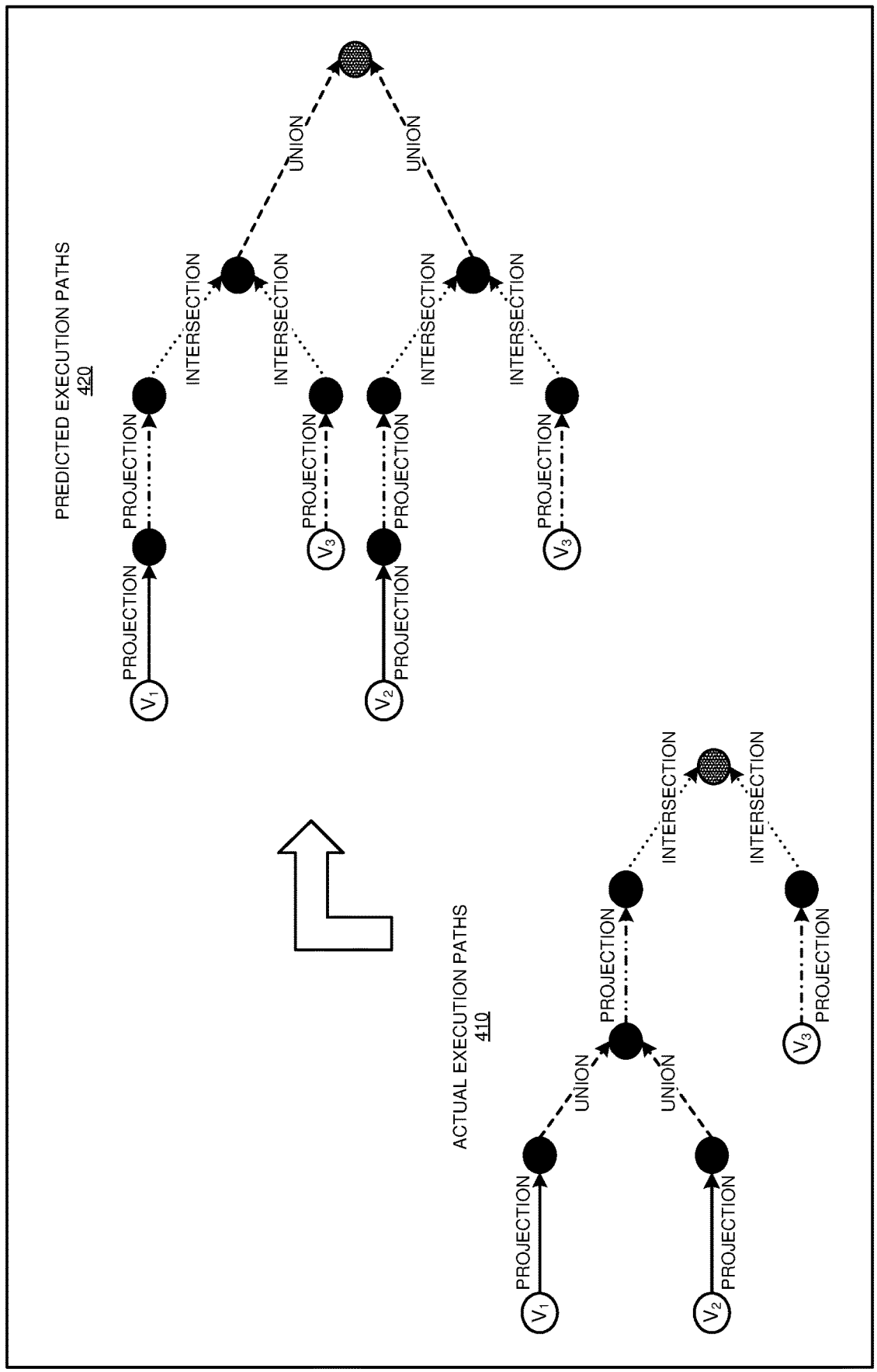
FIG. 4 depicts an example of application function consolidation recommendation in accordance with an illustrative embodiment.

With reference to FIG. 4, this figure depicts an example of application function consolidation recommendation in accordance with an illustrative embodiment. The example can be executed using application 300 in FIG. 3.

Here, analysis module 310 has analyzed an application being executed, generating actual execution paths 410, a segment of a computational graph. Execution prediction module 320 uses a neural network model to predict a set of possible code execution paths of the application, and incorporates the set of possible execution paths into predicted execution paths 420, a computation graph including both actual and possible execution paths of the application being analyzed.

Figure 5:
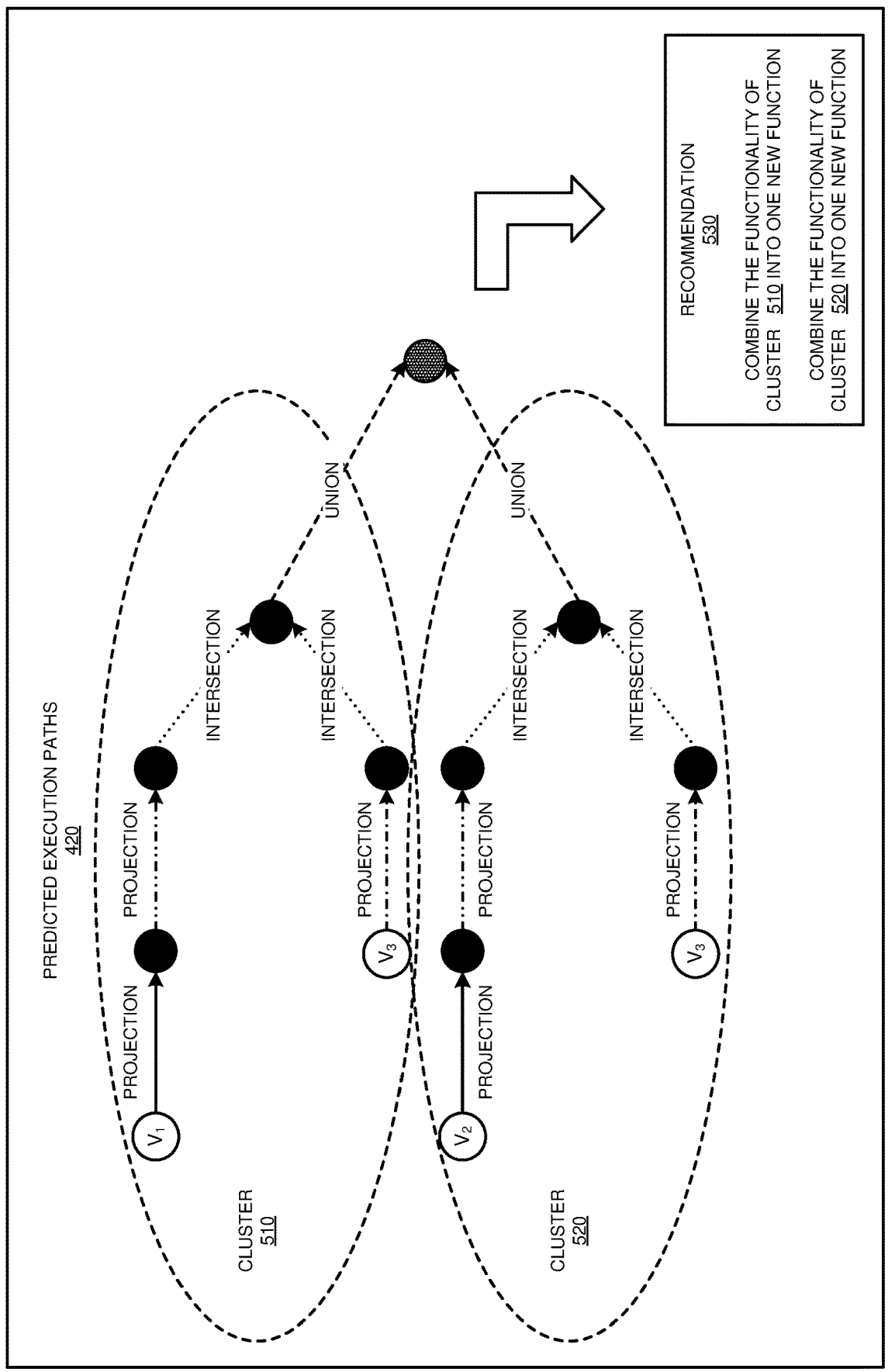
FIG. 5 depicts a continued example of application function consolidation recommendation in accordance with an illustrative embodiment.

With reference to FIG. 5, this figure depicts a continued example of application function consolidation recommendation in accordance with an illustrative embodiment. Predicted execution paths 420 is the same as predicted execution paths 420 in FIG. 4.

Here, clustering module 330 has analyzed predicted execution paths 420 and determined that the paths in cluster 510 have above a threshold similarity to each other and determined that the paths in cluster 520 have above a threshold similarity to each other. Thus, recommendation module 340 produces recommendation 530, recommending that the functionality of cluster 510 be combined into one new function and that the functionality of cluster 520 be combined into another new function.

Figure 6:
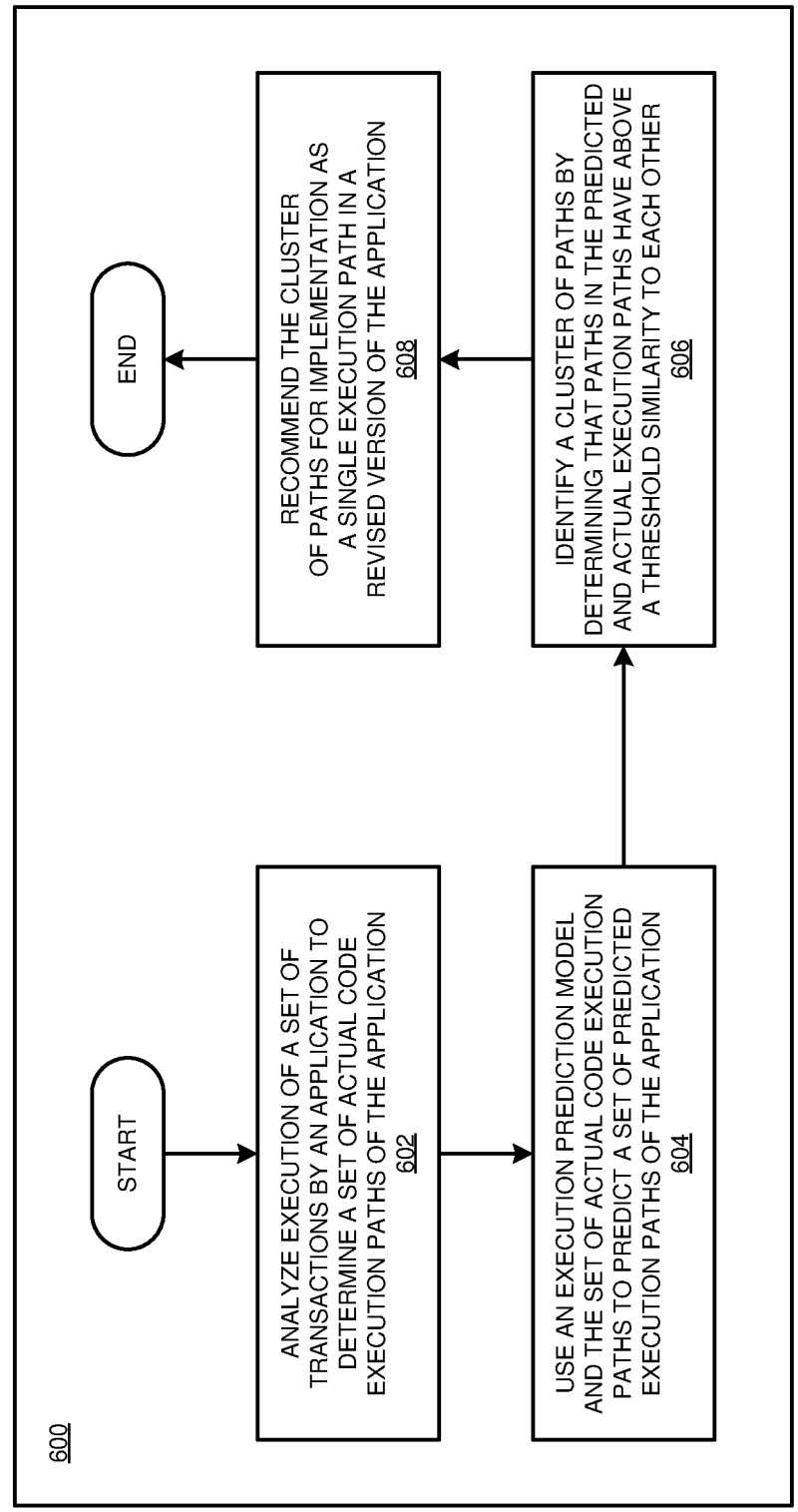
FIG. 6 depicts a flowchart of an example process for application function consolidation recommendation in accordance with an illustrative embodiment.

With reference to FIG. 6, this figure depicts a flowchart of an example process for application function consolidation recommendation in accordance with an illustrative embodiment. Process 600 can be implemented in application 300 in FIG. 3.

In block 602, the application analyzes execution of a set of transactions by an application to determine a set of actual code execution paths of the application. In block 604, the application uses an execution prediction model and the set of actual code execution paths to predict a set of predicted execution paths of the application. In block 606, the application identifies a cluster of paths by determining that paths in the predicted and actual execution paths have above a threshold similarity to each other. In block 608, the application recommends the cluster of paths for implementation as a single execution path in a revised version of the application. Then the application ends.

Figure 7:
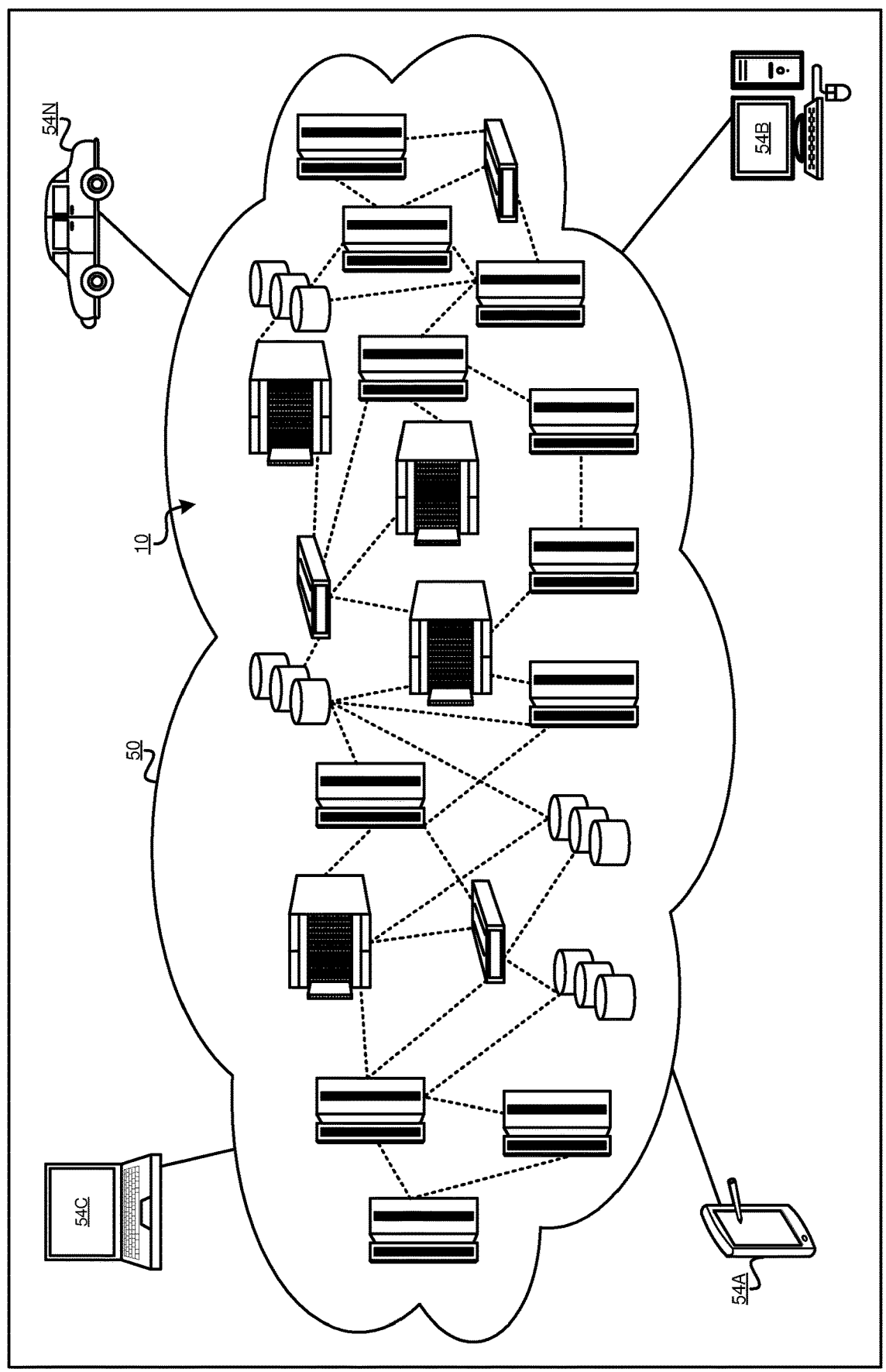
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 8:
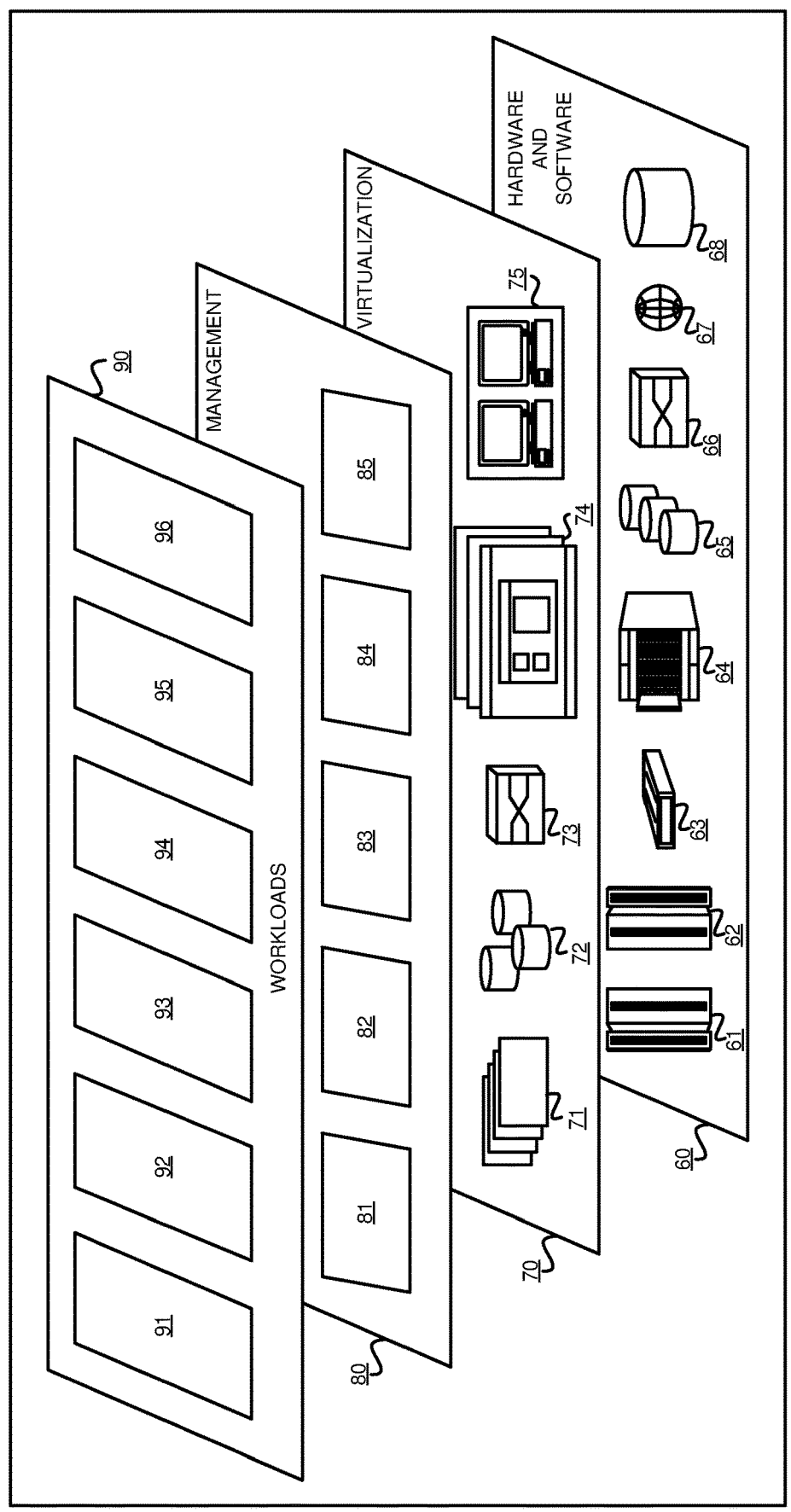
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for application function consolidation recommendation and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   determining, by analyzing execution of a set of transactions by an application, a set of actual code execution paths of the application;
   predicting, from the set of actual code execution paths using an execution prediction model, a set of predicted execution paths of the application, the set of predicted execution paths including the set of actual code execution paths;
   identifying, by determining that paths in the set of predicted execution paths have above a threshold similarity to each other, a cluster of predicted execution paths; and
   recommending, for implementation as a single execution path in a revised version of the application using a recommendation model, the cluster of predicted execution paths.

2. The computer-implemented method of claim 1, wherein the predicting further comprises:
   computing a permutation of an actual code execution path in the set of actual code execution paths;
   predicting, for the permutation, a probability; and
   adding, responsive to the probability being above a threshold probability, the permutation to the set of predicted execution paths.

3. The computer-implemented method of claim 2, wherein predicting the probability further comprises predicting a confidence level corresponding to the probability.

4. The computer-implemented method of claim 1, wherein the recommending is based on a number of interactions between the cluster and a portion of the application outside the cluster.

5. The computer-implemented method of claim 1, wherein the recommending is based on a size of the cluster.

6. The computer-implemented method of claim 1, wherein the recommending is based on an expected future usage of the cluster.

7. The computer-implemented method of claim 1, wherein the recommending is based on a predicted cost savings of executing the revised version of the application relative to the application.

8. The computer-implemented method of claim 1, further comprising:
   determining, by analyzing execution of a second set of transactions by the application, a second set of actual code execution paths of the application; and
   adjusting, based on a comparison between the second set of actual code execution paths and the set of predicted execution paths, the execution prediction model.

9. The computer-implemented method of claim 1, further comprising:
   determining, by analyzing execution of a third set of transactions by the revised version of the application, a third set of actual code execution paths of the revised version of the application; and
   adjusting, based on a comparison between the third set of actual code execution paths and the set of predicted execution paths, the recommendation model.

10. A computer program product for application function consolidation recommendation, the computer program product comprising:
    one or more computer readable storage media, and program instructions collectively stored on the one or more computer readable storage media, the program instructions comprising:
    program instructions to determine, by analyzing execution of a set of transactions by an application, a set of actual code execution paths of the application;
    program instructions to predict, from the set of actual code execution paths using an execution prediction model, a set of predicted execution paths of the application, the set of predicted execution paths including the set of actual code execution paths;
    program instructions to identify, by determining that paths in the set of predicted execution paths have above a threshold similarity to each other, a cluster of predicted execution paths; and
    program instructions to recommend, for implementation as a single execution path in a revised version of the application using a recommendation model, the cluster of predicted execution paths.

11. The computer program product of claim 10, wherein the program instructions to predict further comprises:
    program instructions to compute a permutation of an actual code execution path in the set of actual code execution paths;
    program instructions to predict, for the permutation, a probability; and
    program instructions to add, responsive to the probability being above a threshold probability, the permutation to the set of predicted execution paths.

12. The computer program product of claim 11, wherein program instructions to predict the probability further comprises program instructions to predict a confidence level corresponding to the probability.

13. The computer program product of claim 10, wherein the recommending is based on a number of interactions between the cluster and a portion of the application outside the cluster.

14. The computer program product of claim 10, wherein the recommending is based on a size of the cluster.

15. The computer program product of claim 10, wherein the recommending is based on an expected future usage of the cluster.

16. The computer program product of claim 10, wherein the recommending is based on a predicted cost savings of executing the revised version of the application relative to the application.

17. The computer program product of claim 10, wherein the stored program instructions are stored in the at least one of the one or more storage media of a local data processing system, and wherein the stored program instructions are transferred over a network from a remote data processing system.

18. The computer program product of claim 10, wherein the stored program instructions are stored in the at least one of the one or more storage media of a server data processing system, and wherein the stored program instructions are downloaded over a network to a remote data processing system for use in a computer readable storage device associated with the remote data processing system.

19. The computer program product of claim 10, wherein the computer program product is provided as a service in a cloud environment.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
- program instructions to determine, by analyzing execution of a set of transactions by an application, a set of actual code execution paths of the application;
- program instructions to predict, from the set of actual code execution paths using an execution prediction model, a set of predicted execution paths of the application, the set of predicted execution paths including the set of actual code execution paths;
- program instructions to identify, by determining that paths in the set of predicted execution paths have above a threshold similarity to each other, a cluster of predicted execution paths; and
- program instructions to recommend, for implementation as a single execution path in a revised version of the application using a recommendation model, the cluster of predicted execution paths.

\* \* \* \* \*